US009990666B2

(12) United States Patent
Wang et al.

(10) Patent No.: US 9,990,666 B2
(45) Date of Patent: Jun. 5, 2018

(54) METHOD, SYSTEM AND APPARATUS FOR DELIVERING A RECOMMENDATION

(71) Applicant: CANON KABUSHIKI KAISHA, Tokyo (JP)

(72) Inventors: IJ Eric Wang, Denistone (AU); Sammy Chan, Beecroft (AU); Mark Ronald Tainsh, Pymble (AU); Nicholas Grant Fulton, Turramurra (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 256 days.

(21) Appl. No.: 14/022,824

(22) Filed: Sep. 10, 2013

(65) Prior Publication Data
US 2014/0074653 A1    Mar. 13, 2014

(30) Foreign Application Priority Data

Sep. 12, 2012  (AU) ................. 2012216805
Sep. 17, 2012  (AU) ................. 2012227156

(51) Int. Cl.
G06Q 30/00      (2012.01)
G06Q 30/06      (2012.01)
(52) U.S. Cl.
CPC ................. G06Q 30/0631 (2013.01)
(58) Field of Classification Search
CPC . G06Q 30/0601; G06Q 30/00; G06Q 30/0631
USPC .............................. 705/26.1, 27.1
See application file for complete search history.

(56) References Cited

U.S. PATENT DOCUMENTS

| 5,450,317 | A  | 9/1995  | Lu et al.       |
|-----------|----|---------|-----------------|
| 6,415,194 | B1 | 7/2002  | Gleditsch et al.|
| 6,947,922 | B1 | 9/2005  | Glance          |
| 7,016,865 | B1 | 3/2006  | Weber et al.    |
| 7,412,202 | B2 | 8/2008  | Gutta et al.    |
| 7,536,321 | B2 | 5/2009  | Takahashi et al.|
| 7,647,241 | B1 | 1/2010  | Lilly et al.    |

(Continued)

FOREIGN PATENT DOCUMENTS

AU    2010257310 A1    7/2012

OTHER PUBLICATIONS

Anonymous, "Shutterfly Helps Celebrate Students of All Ages as Graduation Day Approaches," Business Wire, May 14, 2008.*

(Continued)

Primary Examiner — Brandy A Zukanovich
(74) Attorney, Agent, or Firm — Canon U.S.A., Inc. IP Division

(57) ABSTRACT

A method of delivering a recommendation is disclosed. A preference rating is received for each of a plurality of electronic devices based on a task to be recommended, each of the preference ratings defining a preference to perform the recommended task on a corresponding one of the electronic devices. A timeliness profile associated with the recommendation is received. The timeliness profile defines relevance of delivering the recommendation over a period of time. One of the electronic devices on which to deliver the recommendation at a particular point in time is selected based on a function of the preference rating of the selected electronic device and the timeliness profile associated with the recommendation at that point in time.

21 Claims, 14 Drawing Sheets

(56) References Cited

U.S. PATENT DOCUMENTS

| | | | |
|---|---|---|---|
| 7,665,105 B2 | 2/2010 | Evans | |
| 7,672,937 B2 | 3/2010 | Madhavan et al. | |
| 7,756,879 B2 | 7/2010 | Parsons et al. | |
| 7,904,975 B2 | 3/2011 | Kruglikov et al. | |
| 8,326,793 B1 * | 12/2012 | Bowers | G06F 9/50 706/45 |
| 8,452,797 B1 * | 5/2013 | Paleja | G06Q 30/02 707/767 |
| 2002/0152128 A1 | 10/2002 | Walch et al. | |
| 2003/0110056 A1 | 6/2003 | Berghofer et al. | |
| 2003/0149612 A1 | 8/2003 | Berghofer et al. | |
| 2007/0083410 A1 | 4/2007 | Hanna | |
| 2007/0179841 A1 | 8/2007 | Agassi et al. | |
| 2008/0201225 A1 | 8/2008 | Maharajh et al. | |
| 2011/0173042 A1 | 7/2011 | Riepshoff et al. | |
| 2011/0191311 A1 | 8/2011 | Polonsky et al. | |
| 2011/0320307 A1 * | 12/2011 | Mehta | G06Q 30/0282 705/26.7 |
| 2012/0036523 A1 | 2/2012 | Weintraub et al. | |
| 2012/0078725 A1 | 3/2012 | Maitra et al. | |
| 2013/0041774 A1 * | 2/2013 | Emura | G06Q 30/02 705/26.7 |

OTHER PUBLICATIONS

"iOS: Using Reminders." Apple Support. Apple, Sep. 24, 2013. Web. Sep. 27, 2013, http://support.apple.com/kb/HT4970.
"SuperFetch" from "Windows Vista I/O technologies." Wikipedia, Aug. 19, 2013. Web. Sep. 27, 2013, http://en.wikipedia.org/wiki/Windows_Vista_I/O_technologies#SuperFetch.

* cited by examiner

192

210

| SessionPeriod | DeviceType | Probability |
|---|---|---|
| Monday 0700-0730 | Tablet | 95% |
| Monday 0800-0900 | Smartphone | 90% |
| Monday 1800-1900 | Smartphone | 90% |
| Monday 2030-2130 | PC | 80% |
| Tuesday 0700-0730 | Tablet | 95% |
| Tuesday 0800-0900 | Smartphone | 90% |
| Tuesday 1800-1900 | Smartphone | 90% |
| Tuesday 2030-2130 | PC | 50% |
| Wednesday 0700-0730 | Tablet | 95% |
| Wednesday 0800-0900 | Smartphone | 90% |
| Wednesday 1800-1900 | Smartphone | 90% |
| Wednesday 2030-2130 | PC | 50% |
| Thursday 0700-0730 | Tablet | 95% |
| Thursday 0800-0900 | Smartphone | 90% |
| Thursday 1800-1900 | Smartphone | 90% |
| Thursday 2030-2130 | PC | 50% |
| Friday 0700-0730 | Tablet | 95% |
| Friday 0800-0900 | Smartphone | 90% |
| Friday 1800-1900 | Smartphone | 90% |
| Friday 2030-2130 | PC | 80% |
| Saturday 0800-0900 | Tablet | 90% |
| Saturday 2100-2230 | PC | 75% |
| Sunday 0800-0900 | Tablet | 90% |
| Sunday 2000-2100 | Tablet | 80% |

Fig. 2

| SessionPeriod | DeviceType | TypeOfAppSet | InteractivityLevel | GeoLocation | LogicalLocation |
|---|---|---|---|---|---|
| 0800-0900 Monday | smart phone | InternetBrowser | 5 gestures/min | -33.747466, 51.065001 | Travelling from home to work |
| 1800-0900 Monday | smart phone | Game InternetBrowser | 45 gestures/min | -33.771299, 151.120348 | Travelling from work to home |
| 2030-2100 Monday | Tablet | Photography | 15 gestures/min | -33.754112, 151.088081 | Home |

Fig. 8

| DeviceType | InteractivityLevel | Duration | PreferredLocation |
|---|---|---|---|
| smart phone | 10 gestures/min | 5 mins | None |
| Tablet | 35 gestures/min | 45 mins | Home |
| smart phone | 15 gestures/min | 15 mins | Travelling from work to home, Travelling from home to work, Home |

Fig. 10

METHOD, SYSTEM AND APPARATUS FOR DELIVERING A RECOMMENDATION

REFERENCE TO RELATED PATENT APPLICATIONS

This application claims the benefit under 35 U.S.C. § 119 of the filing dates of Australian Patent Application No. 2012216805, filed 12 Sep. 2012, and Australian Patent Application No. 2012227156, filed 17 Sep. 2012, which are hereby incorporated by reference in their entirety as if fully set forth herein.

FIELD OF INVENTION

The current invention relates generally to delivery of recommendations and, in particular, the suitability of a recommendation to be delivered to an electronic device. The present invention also relates to a method and apparatus for delivering a recommendation, and to a computer program product including a computer readable medium having recorded thereon a computer program for delivering a recommendation.

DESCRIPTION OF BACKGROUND ART

Recommendation has become a common feature in many electronic devices and other systems. When there are a multitude of choices available to a user or when a user is unaware of the availability of potentially desirable goods and services, a recommendation system can be a useful tool for the user by bringing relevant choices to the attention of the user. Thus, a lot of time and effort can be saved by the user in discovering individual choices.

Recommendation systems are commonly used by online retailers to generate purchase recommendations. Such recommendation systems are also used by media content providers to generate, for example, movie, music and news content recommendations. The recommendations are typically based on the user's own past behaviours and other similar users' past behaviours. Various degrees of personalisation may also be employed by a recommendation system to relate a recommendation to a personal aspect of the user in order to increase the effectiveness of the recommendation. One example of such personalisation is the making of a recommendation for purchasing a gift for a loved one near a birthday of the loved one.

As the popularity of using various recommendation methods grows, the number of recommendations targeting a user has also increased dramatically. A user may receive a recommendation on a number of devices available to the user, such as a mobile phone (e.g, a smart phone), tablet or personal computer (PC) in various forms such as an email, a notification on a mobile application or an advertisement on a web page. Often, these recommendations are presented to the user unsolicited, causing the user to perceive them as advertising spam, especially when the current environment or user's mind-set is unsuitable to act upon a recommendation. Under such circumstances, a recommendation presented to the user may be ignored or, at best, the action required for the recommendation may be postponed. Any postponed recommendations may be forgotten by the user or the desire for utilising the recommendations may wane before the user has a chance to follow-up on the recommended action. Such postponed recommendations can cause a low utilisation of recommendations even if the recommendations are relevant and appropriately personalised.

SUMMARY OF THE INVENTION

It is an object of the present invention to substantially overcome, or at least ameliorate, one or more disadvantages of existing arrangements.

According to one aspect of the present disclosure there is provided a method of delivering a recommendation to perform a task, said method comprising:

receiving a preference rating for each of a plurality of electronic devices based on a task to be recommended, each of said preference ratings defining a preference to perform the recommended task on a corresponding one of said electronic devices;

receiving a timeliness profile associated with the recommendation, said timeliness profile defining relevance of delivering the recommendation over a period of time; and delivering the recommendation at a particular point in time by selecting one of said electronic devices on which the recommended task is to be performed based on a function of the preference rating of the selected electronic device and the timeliness profile associated with the recommendation at that point in time.

According to another aspect of the present disclosure there is provided a system for delivering a recommendation to perform a task, said system comprising:

a memory for storing data and a computer program;

a processor coupled to said memory for executing said computer program, said computer program comprising instructions for:

receiving a preference rating for each of a plurality of electronic devices based on a task to be recommended, each of said preference ratings defining a preference to perform the recommended task on a corresponding one of said electronic devices;

receiving a timeliness profile associated with the recommendation, said timeliness profile defining relevance of delivering the recommendation over a period of time; and delivering the recommendation at a particular point in time by selecting one of said electronic devices on which the recommended task is to be performed based on a function of the preference rating of the selected electronic device and the timeliness profile associated with the recommendation at that point in time.

According to still another aspect of the present disclosure there is provided an apparatus for delivering a recommendation to perform a task, said apparatus comprising:

means for receiving a preference rating for each of a plurality of electronic devices based on a task to be recommended, each of said preference ratings defining a preference to perform the recommended task on a corresponding one of said electronic devices;

means for receiving a timeliness profile associated with the recommendation, said timeliness profile defining relevance of delivering the recommendation over a period of time; and means for delivering a recommendation at a particular point in time by selecting one of said electronic devices on which the recommended task is to be performed based on a function of the preference rating of the selected electronic device and the timeliness profile associated with the recommendation at that point in time.

According to still another aspect of the present disclosure there is provided a computer readable medium having a computer program stored thereon for delivering a recommendation to perform a task, said program comprising:

code for receiving a preference rating for each of a plurality of electronic devices based on a task to be recommended, each of said preference ratings defining a preference to perform the recommended task on a corresponding one of said electronic devices;

code for receiving a timeliness profile associated with the recommendation, said timeliness profile defining relevance of delivering the recommendation over a period of time; and code for delivering a recommendation at a particular point in time by selecting one of said electronic devices on which the recommended task is to be performed based on a function of the preference rating of the selected electronic device and the timeliness profile associated with the recommendation at that point in time.

According to still another aspect of the present disclosure there is provided a method of determining a suitability rating for a recommendation, said method comprising:

determining a usage profile for an electronic device, said usage profile defining a measure of user interactions with the device for a period of time;

accessing an engagement profile associated with at least one task to be recommended, said engagement profile identifying device user interactions required in order to action the task; and determining a suitability rating for the recommendation by comparing the determined usage profile for the device with the engagement profile associated with the task.

According to still another aspect of the present disclosure there is provided an apparatus for determining a suitability rating for a recommendation, said apparatus comprising:

means for determining a usage profile for an electronic device, said usage profile defining a measure of user interactions with the device for a period of time;

means for accessing an engagement profile associated with at least one task to be recommended, said engagement profile identifying device user interactions required in order to action the task; and means for determining a suitability rating for the recommendation by comparing the determined usage profile for the device with the engagement profile associated with the task.

According to still another aspect of the present disclosure there is provided a system for determining a suitability rating for a recommendation, said system comprising:

a memory for storing data and a computer program;

a processor coupled to the memory for executing said computer program, said computer program comprising instructions for:

determining a usage profile for an electronic device, said usage profile defining a measure of user interactions with the device for a period of time;

accessing an engagement profile associated with at least one task to be recommended, said engagement profile identifying device user interactions required in order to action the task; and determining a suitability rating for the recommendation by comparing the determined usage profile for the device with the engagement profile associated with the task.

According to still another aspect of the present disclosure there is provided a computer readable medium with a computer program stored thereon for determining a suitability rating for a recommendation, said computer program comprising:

code for determining a usage profile for an electronic device, said usage profile defining a measure of user interactions with the device for a period of time;

code for accessing an engagement profile associated with at least one task to be recommended, said engagement profile identifying device user interactions required in order to action the task; and code for determining a suitability rating for the recommendation by comparing the determined usage profile for the device with the engagement profile associated with the task.

Other aspects of the invention are also disclosed.

BRIEF DESCRIPTION OF THE DRAWINGS

One or more embodiments of the invention will now be described with reference to the following drawings, in which:

FIG. 2 shows structure and example data of a usage profile;

FIG. 8 shows an extended structure and example data of a usage profile with operating conditions;

FIG. 10 shows structure and example data of an engagement profile;

DETAILED DESCRIPTION OF EMBODIMENTS OF THE INVENTION

Figure 1A:
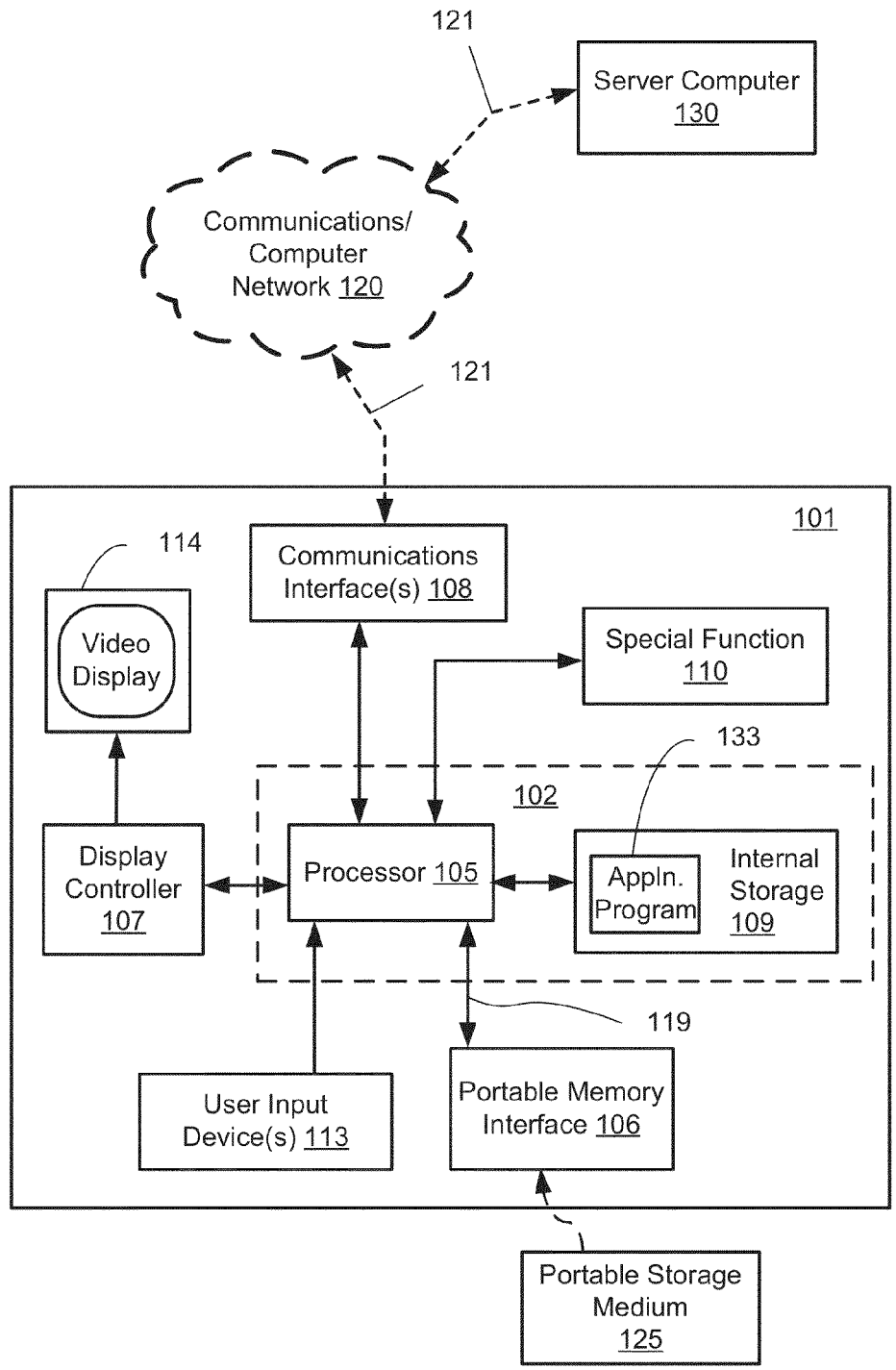
FIGS. 1A and 1B collectively form a schematic block diagram representation of an electronic device, a communications network and a server computer, upon which described arrangements can be practised.

Where reference is made in any one or more of the accompanying drawings to steps and/or features, which have the same reference numerals, those steps and/or features have for the purposes of this description the same function(s) or operation(s), unless the contrary intention appears.

Figure 1B:
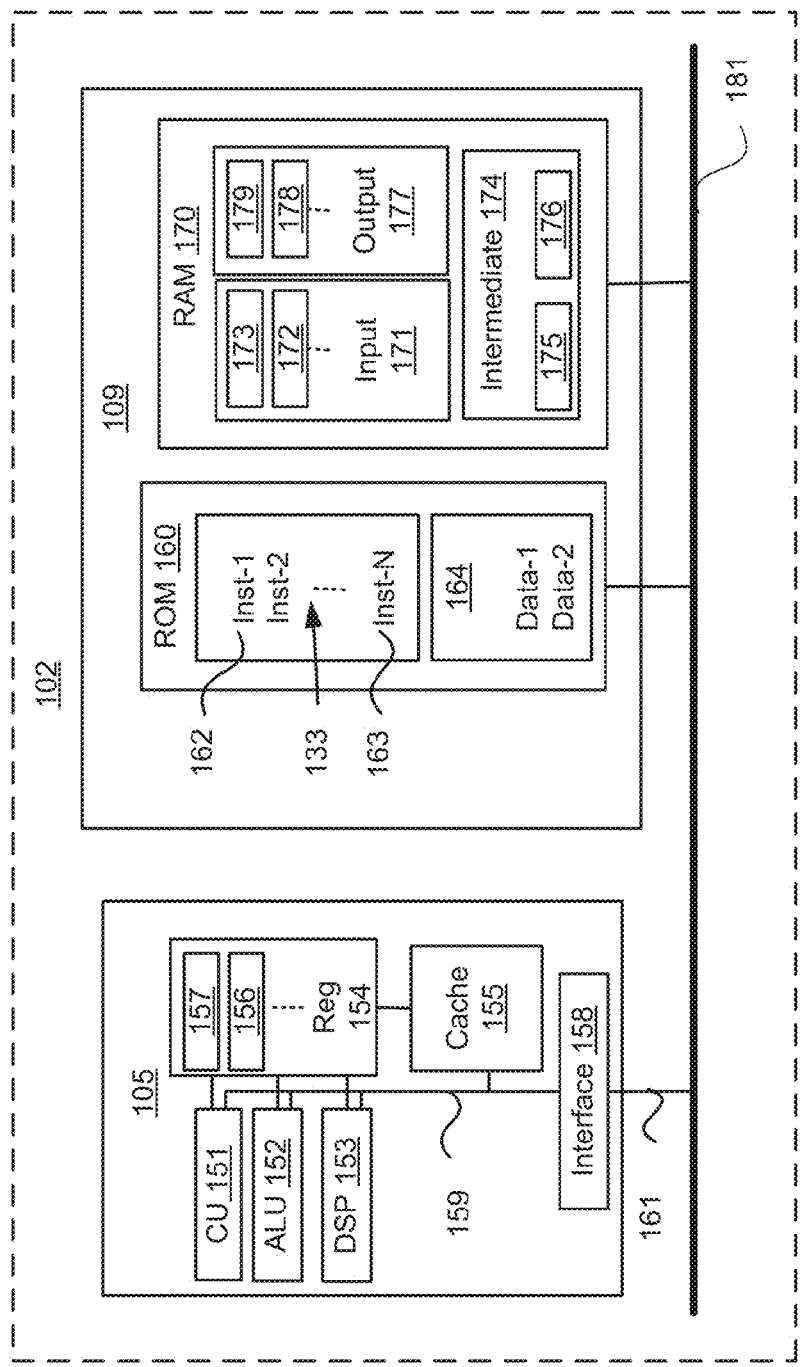
Figure 6:
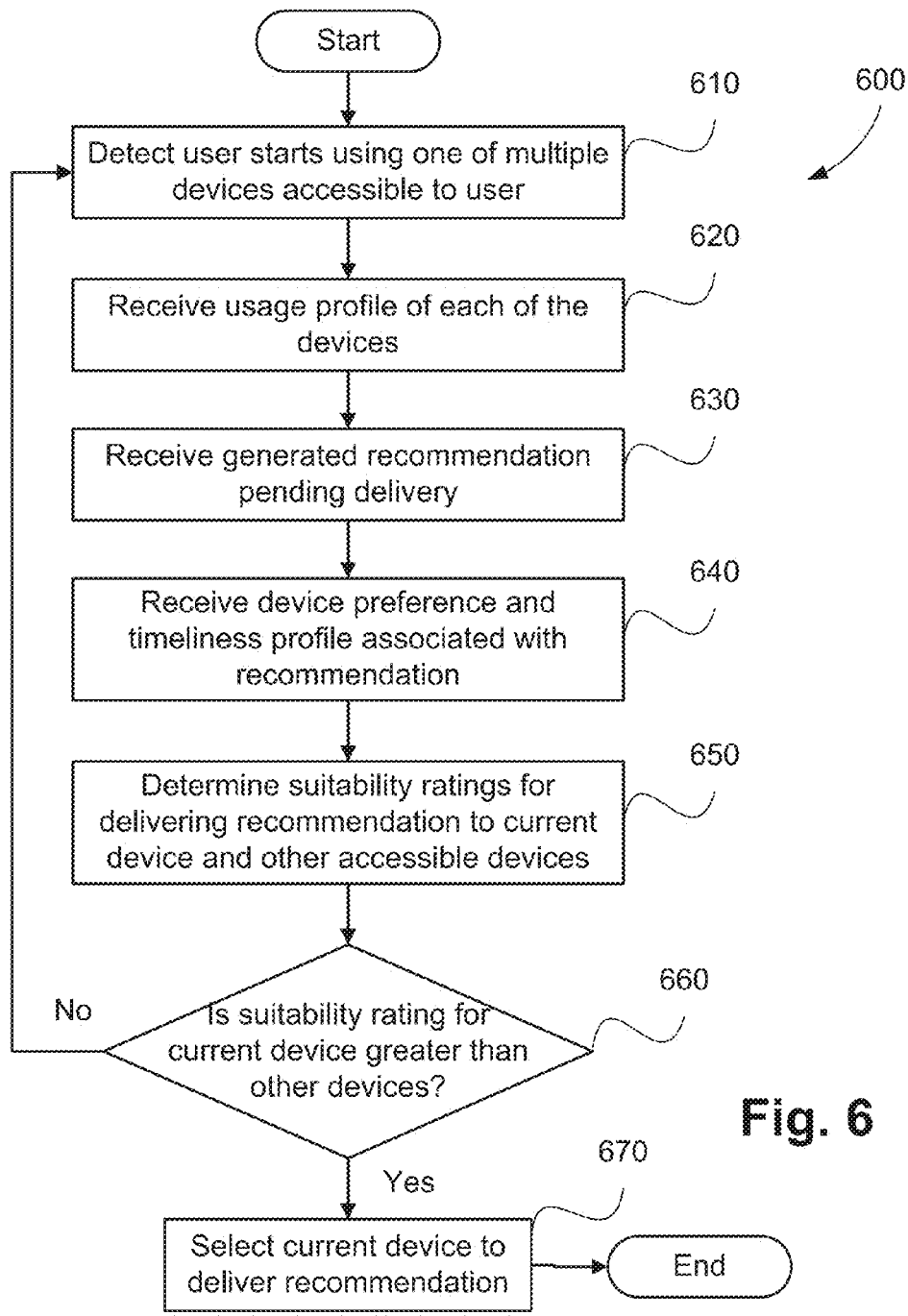
FIG. 6 is a schematic flow diagram showing a method of selecting an electronic device for delivering a recommendation.

A method 600 of selecting an electronic device for delivering a recommendation is described below with reference to FIG. 6. FIGS. 1A and 1B collectively form a schematic block diagram of a general purpose electronic device 101, including embedded components, and a general purpose server computer 130. The electronic device 101 is connected to the computer 130 via a network 120. The described methods are desirably and collaboratively practiced on the electronic device 101 and the server computer 130. The electronic device 101 may be, for example, a mobile phone (e.g., smart phone), a portable media player, personal data assistant or a digital camera, in which processing resources are limited. One or more of the methods to be described may also be performed on other higher-level devices such as desktop computers, server computers (e.g., the computer 130), and other such devices with significantly larger processing resources.

As seen in FIG. 1A, the electronic device 101 comprises an embedded controller 102. Accordingly, the electronic device 101 may be referred to as an "embedded device." In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

The electronic device 101 includes a display controller 107, which is connected to a video display 114, such as a liquid crystal display (LCD) panel or the like. The display controller 107 is configured for displaying graphical images on the video display 114 in accordance with instructions received from the embedded controller 102, to which the display controller 107 is connected.

The electronic device 101 also includes user input devices 113 which are typically formed by keys, a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1A, the electronic device 101 also comprises a portable memory interface 106, which is coupled to the processor 105 via a connection 119. The portable memory interface 106 allows a complementary portable memory device 125 to be coupled to the electronic device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 101 also has a communications interface 108 to permit coupling of the device 101 to a computer or communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 101 is configured to perform some special function. The embedded controller 102, possibly in conjunction with further special function components 110, is provided to perform that special function. For example, where the device 101 is a digital camera, the components 110 may represent a lens, focus control and image sensor of the camera. The special function components 110 are connected to the embedded controller 102. As another example, the device 101 may be a mobile telephone handset. In this instance, the components 110 may represent those components required for communications in a cellular telephone environment. Where the device 101 is a portable device, the special function components 110 may represent a number of encoders and decoders of a type including Joint Photographic Experts Group (JPEG), (Moving Picture Experts Group) MPEG, MPEG-1 Audio Layer 3 (MP3), and the like.

The server computer 130 has a similar configuration to the electronic device 101. The server computer 130 also consists of similar embedded components (e.g., a processor and memory) to the electronic device 101 but at a larger scale of performance and resources. The components of the server computer 130, such as the processor and memory of the server computer 130, have a similar function to the corresponding components of the device 101. Accordingly, the server computer 130 will not be described in detail. However, a reference to an embedded component of the device 101, e.g. the embedded controller 102, may also be applied to the equivalent component of the server computer 130 unless the reference is specifically made for the electronic device 101 or the computer server 130.

The methods described hereinafter may be implemented using the embedded controller 102 of the device 101 and the embedded controller 102 of the server computer 130. The processes of FIGS. 2 to 12 may be implemented as one or more software application programs 133 executable within the embedded controller 102 of the device 101 and the embedded controller 102 of the server computer 130. Accordingly, the electronic device 101 and the server computer 130 of FIG. 1A implement the described methods.

With reference to FIG. 1B, the steps of the described methods may be effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109 of the device 101 and the server computer 130. The software 133 stored in the ROM 160 can be updated when required from a computer readable medium. The software 133 can be loaded into and executed by the processor 105 of the device 101 and the server computer 130. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 of the device 101 and the server computer 130 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the electronic device 101. However, in some instances, the application programs 133 may be supplied to the user encoded on one or more CD-ROM (not shown) and read via the portable memory interface 106 of FIG. 1A prior to storage in the internal storage module 109 or in the portable memory 125. In another alternative, the software application program 133 may be read by the processor 105 of the device 101 and the server computer 130 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of transitory or non-tangible computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 1A. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1B illustrates in detail the embedded controller 102 having the processor 105 for executing one or more of the application programs 133 and the internal storage 109 in the electronic device 101. Again, one or more of the application programs 133 may also be executed by the processor 105 of the server computer 130.

The internal storage 109 comprises read only memory (ROM) 160 and random access memory (RAM) 170. The processor 105 is able to execute the application programs 133 stored in one or both of the connected memories 160 and 170. When the electronic device 101 or the server computer 130 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 though 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the electronic device 101 or the server computer 130. Typically, the application program 133 waits for events and subsequently executes the block of code associated with that event. Events may be triggered in response to input from a user, via the user input devices 113 of FIG. 1A, as detected by the processor 105. Events may also be triggered in response to other sensors and interfaces in the electronic device 101 or the server computer 130.

The execution of a set of the instructions may require numeric variables to be read and modified. Such numeric variables are stored in the RAM 170. The disclosed methods use input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the electronic device 101 or the server computer 130.

The described methods may be used to determine a time for delivering a recommendation to a user, where the user has access to multiple electronic devices for personal use. As described above, the electronic devices available to the user may include, for example, a mobile phone (e.g., smart phone), a portable media player, personal data assistant, a digital camera or a personal computer (PC). The user may select to use one of the electronic devices (e.g., the tablet computer device 101-B) over another based on current availability of the selected device, the type of activity the user is conducting or simply a personal preference. With the usage of the multiple electronic devices by the user over time, a usage profile of the electronic devices may be determined to show a regular pattern of when the user uses which of the multiple devices.

A recommendation may be associated with the performance of a task by a user and the task may be associated with preference for a type of device for performing the recommended task. For example, a recommendation for creating a photo-book for the birthday of a friend requires the user to perform a photo book creation task and the preferred devices for the task may be the personal computer, followed by the tablet, etc.

A recommendation may be time sensitive such that the relevance of the recommendation to the user is a function of time. For example, the relevance of the photo book recommendation described above increases towards the date of the birthday. Further, the relevance of the photo book recommendation quickly diminishes when a current time gets too close to the date of the birthday to make the photo book, since making the photo book usually requires a reasonable amount effort from the user and a period of several days for production and shipping after an order is placed.

The described methods profile a usage pattern for the multiple devices available to the user. The described methods also determine a particular point in time for delivering a time-sensitive recommendation to one of the devices on which a recommended task is to be performed. The particular point in time for delivering the recommendation may be determined based on whether the user will find the recommendation relevant and whether the device receiving the recommendation is suitable for performing the task associated with the recommendation. As described below, one of devices on which the recommended task is to be performed may be selected based on a function of a preference rating of the selected device and a timeliness profile associated with the recommendation.

Figure 1C:
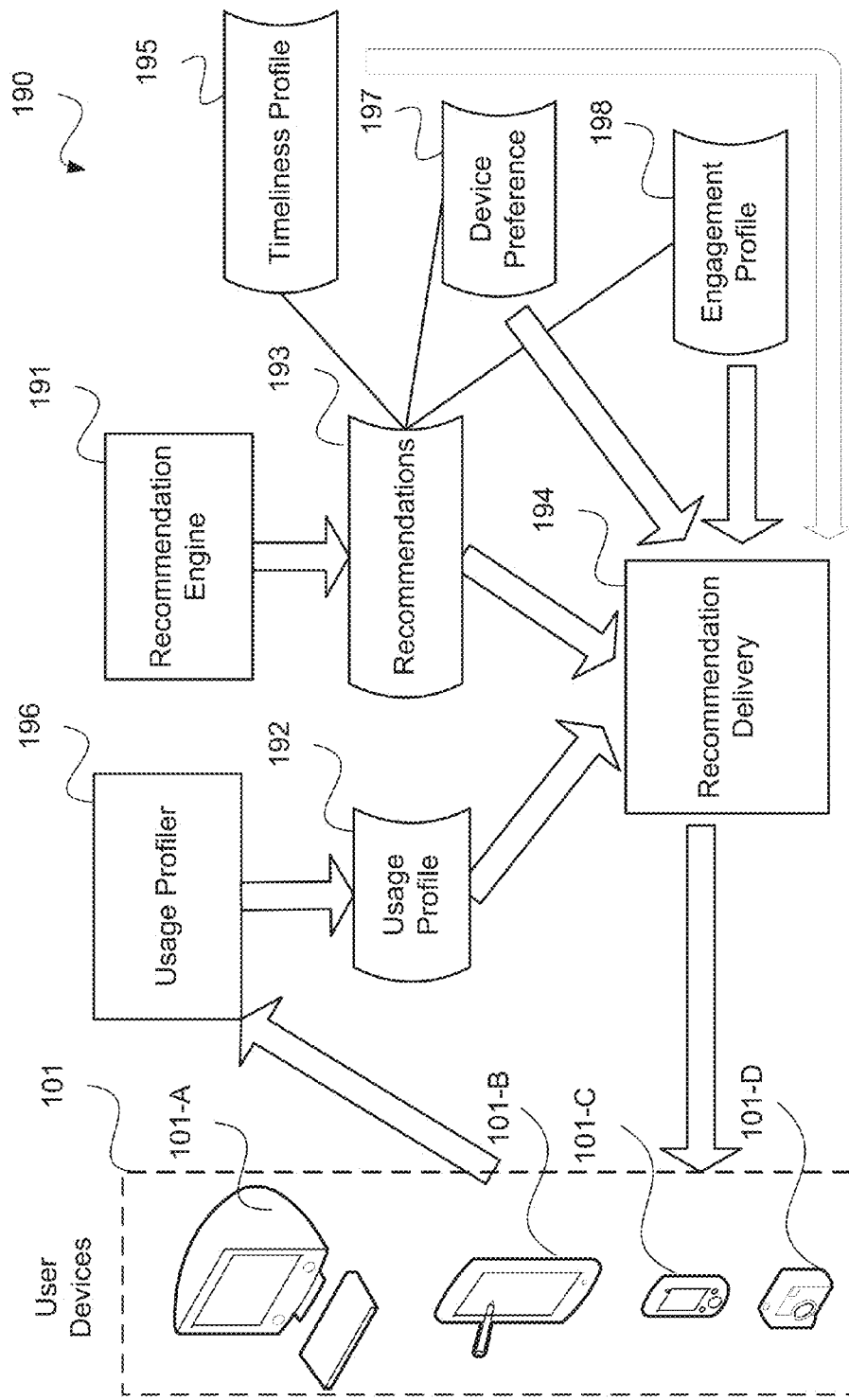
FIG. 1C is a schematic block diagram of a software architecture for use with the described arrangements.

FIG. 1C is a schematic diagram showing a software architecture 190 for use in the described methods. In the example of FIG. 1C, the user has access to multiple electronic devices 101-A, 101-B, 101-C and 101-D. The device 101-B is a tablet computer, the device 101-C is a smart phone and the device 101-D is a digital camera. Each of the devices 101-B, 101-C and 101-D are configured as described above with reference to FIGS. 1A and 1B, with each of the devices 101-B, 101-C and 101-D having a corresponding processor 105, storage module 109, display device 114 as well as the other components described above with reference to FIGS. 1A and 1B. Further, the device 101-A is a personal computer (PC), which again has a similar configuration to the other devices 101-B, 101-C, 101-D, albeit in the form of a PC. The electronic devices 101-A, 101-B, 101-C and 101-D will be referred to generically below as the electronic devices 101 unless one of the devices 101-A, 101-B, 101-C and 101-D is referred to specifically. The software architecture 190 comprises software code modules 191, 194 and 196 as described below, which may form part of the software application program 133.

As seen in FIG. 1C, a usage profiler module 196 examines patterns in usage history of the electronic devices 101 and constructs a usage profile 192 of the user using the electronic devices 101. The usage profiler module 196 may be configured for capturing the usage history of the electronic devices 101 from the storage module 109, for example. The usage profile 192 is determined from previously captured usage history.

A recommendation engine module 191 generates recommendations 193 for the user. The generated recommendations 193 may be used, for example, to create a personalised photo merchandise product. For example, a particular recommendation may recommend that the user perform the task of creating the personalised photo merchandise product.

Any suitable method may be used by the recommendation module 191 for generating the recommendations 193. Typically, such methods involve a combination of following explicit preferences specified by the user, analysing the past behaviours of the user to predict future behaviours and using collaborative filtering methods to predict behaviours of the user based on other similar users.

Each generated recommendation 193 is associated with a device preference 197 indicating preferred electronic devices for receiving the recommendation 193, a timeliness profile 195 defining relevance of a recommendation 193 as a function of time and an engagement profile 198 hinting the degree of effort required of the user to perform the associated task. As described below, the timeliness profile 195 defines changing relevance of delivering the recommendation 193 over a period of time. When the user starts using one of the devices 101 and when there is a recommendation 193 pending delivery, recommendation delivery module 194, under execution of the processor 105, determines if a current point in time is likely to be an appropriate time for delivering the recommendation 193. The recommendation delivery module 194 makes the determination based on the current device 101 being used, device preference 197 of the current device 101, the timeliness profile 195 and the engagement profile 198 of the recommendation 193 to be delivered.

If the current point in time is not appropriate, the recommendation delivery module 194 may determine that there is potentially a better time for delivering the recommendation 193. Again, the recommendation delivery module 194 makes the determination based on the usage profile 192 which may indicate a future use of this or another device 101 at a better time.

In one arrangement, the usage profiler module 196 may be implemented in the electronic device 101 where the device usage pattern can be locally monitored to generate the usage profile 192 to be transferred and stored on the server computer 130. The remaining modules, 191 and 194, may be implemented in the server computer 130 where the recommendation processing can utilise a greater amount of computing resources and the processing can be centralised for all the devices 101. Similarly, the usage profile 192, recommendations 193, timeliness profile 195, engagement profile 198 and device preference 197 may be stored within a storage module 109 of the server computer 130.

FIG. 2 shows an example of a usage profile 192. The usage profile 192 is a pattern of typical device usage sessions for the electronic devices 101 accessible to the user. As described in detail below, a particular cluster of one or more of the usage sessions is represented in the usage profile 192 by a particular device usage session record (e.g., 210). Each device usage record 210 may comprise the following fields:

(i) SessionPeriod: time period of a typical usage session;
(ii) DeviceType: type of device used in the session; and
(iii) Probability: probability of the session happening. For example, the device usage session record 210 indicates that there is a 95% probability that the user will use the tablet device 101-B between 7 AM and 7:30 AM on Mondays.

The usage profile 192 enables the recommendation delivery module 194, under execution of the processor 105, to predict a likely usage of a particular device 101 in the future, which is a potential opportunity for delivering a recommendation 193.

Figure 3:
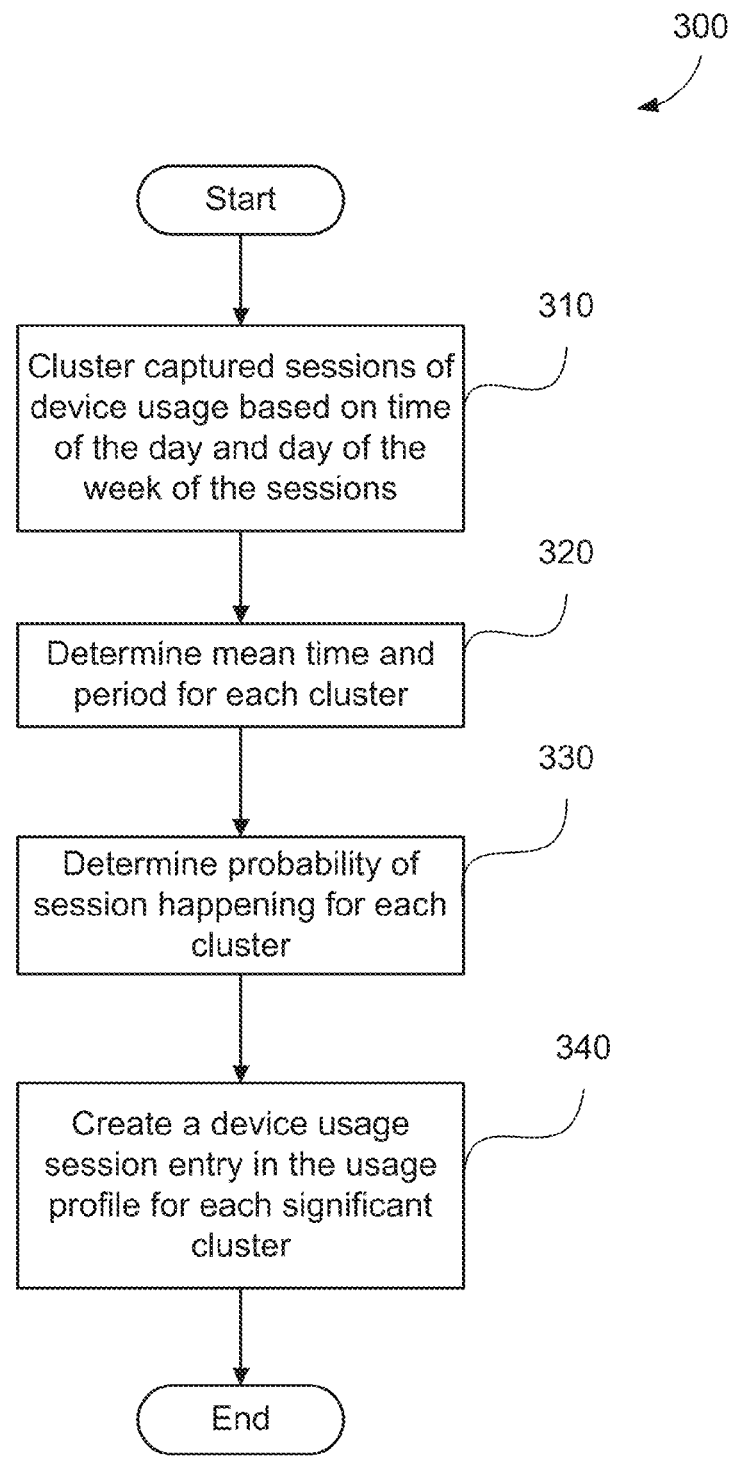
FIG. 3 is a schematic flow diagram showing a method of determining a usage profile.

FIG. 3 is a schematic flow diagram showing a method 300 of determining a usage profile. The method 300 may be implemented as one or more software code modules of the software application program 133 (e.g., the usage profiler module 196) resident in the ROM 160 and being controlled in its execution by the processor 105 of the device 101. The method 300 will be described by way of example where a record 210 of the usage profile 196 is determined for the tablet electronic device 101-B. However, the steps 310 to 340 of the method 300 are executed for each of the electronic devices 101-A, 101-B, 101-C and 101-D. The method 300 determines the usage profile 192 from the analytics of collected device usage sessions.

The usage profile 192 determined in accordance with the method 300 includes the information for three of the fields described above (i.e., Session Period, DeviceType and Probability). The determined usage profile 192 is configured for defining a measure of user interactions with each of the electronic devices 101-A, 101-B, 101-C and 101-D for a period of time.

The method 300 starts at collecting step 310, where the usage profiler 196, under execution of the processor 105 of the device 101, clusters collected usage sessions based on time of the day and the day of the week (e.g., Monday, 0700-0730) for each of the electronic devices 101. Each resulting cluster corresponds to a regular behaviour of usage of a particular device by the user and is represented by a record (e.g., 210) created in the usage profile 192 stored within the storage module 109. Each cluster is associated with the SessionPeriod field of the usage profile 192 stored within the storage module 109 of the device 101.

At mean time determining step 320, the sessions in each cluster are aggregated by the processor 105 to determine a mean time of the day and day of the week representative of the sessions in the cluster. As described above, each cluster is represented by a record (e.g., 210) created in the usage profile 192 stored within the storage module 109 of the device 101.

Then at probability determining step 330, the number of sessions in each cluster and the time period for collecting the analytics are used to determine probability of a similar session occurring in the future. The probability may be determined in accordance with Equation (1), as follows:

$$\text{probability} = \text{number of sessions in cluster/maximum number of sessions within time period.} \quad (1)$$

For example, if there are forty (40) sessions in a cluster representative of a session where the user uses the tablet 101-B between 7 AM and 7:30 AM on work-day Mondays during a period of one year for collecting the analytics, the probability of such a session eventuating in the future is 40/52=87%.

At creating step 340, the usage profiler module 196, under execution of the processor 105, creates a record (e.g., 210) in the usage profile 192 for each significant cluster representing a typical regular usage of a particular electronic device 101 by the user. A particular cluster may be determined to be significant at step 340 if the determined probability is greater than 50%. The data of usage profile 192 specific to each of the user's devices 101 is transferred from each device 101 to the server computer 130 over the network 120 using the connection 121 for recommendation processing.

Figure 4:
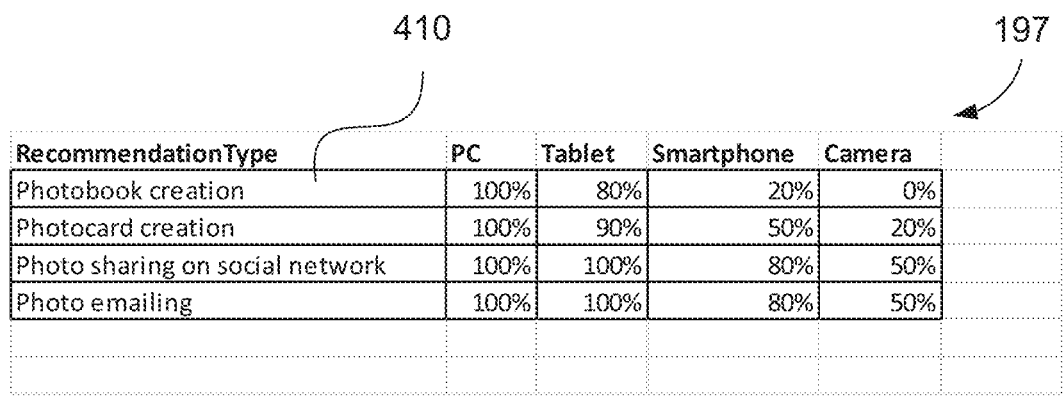
FIG. 4 shows an example of device preference structure and values.

FIG. 4 shows an example of device preferences 197 associated with various types of recommendations 193. The device preferences 197 associated with each type of recommendation is represented by a device preference record 410. Each device preference record 410 comprises a RecommendationType field which defines the type of recommendation that may be associated with a task. Each device preference record (e.g., 410) also comprises preference ratings in the form of percentage values corresponding to each type of electronic device 101-A, 101-B, 101-C and 101-D. Each preference rating percentage value of a particular record 410 represents preference of the user for using the corresponding device (e.g., 101A) for performing the task associated with the recommendation. Each of the preference rating percentage values of the device preferences also defines preference of the user for performing the task associated with the recommendation on the corresponding device (e.g., 101A). For example, as seen in FIG. 4, a photo book creation recommendation is preferred to be received and acted upon on the PC 101-A (i.e., preference rating=100%), followed by the tablet device 101-B (i.e., preference rating=80%), smartphone 101-C (i.e., preference rating=20%) and camera 101-D (i.e., preference rating=0%). The device preference ratings represented by the percentage values may be determined from the user's history of performing the particular type of task on the various electronic devices 101. The percentage of occurrences of using a particular device (e.g., 101-A) for a particular type of task may be used to correlate the preference for using the device 101-A for the type of task. For example, if the user has created ten (10) photo books in the past, five on the PC 101-A, four on the tablet device 101-B and one on the smartphone device 101-C, then the percentages of occurrences for using the devices 101 will be 0.5, 0.4 and 0.1 respectively. Normalising the determined percentage values and using the normalised percentage values as device preferences yields 100%, 80% and 20% as in the record 410 shown in FIG. 4.

In another arrangement, if a new user has very little history in performing the tasks that may be associated with a recommendation, the percentage preference values for the record 410 may be determined as an average from other users.

Figure 5A:
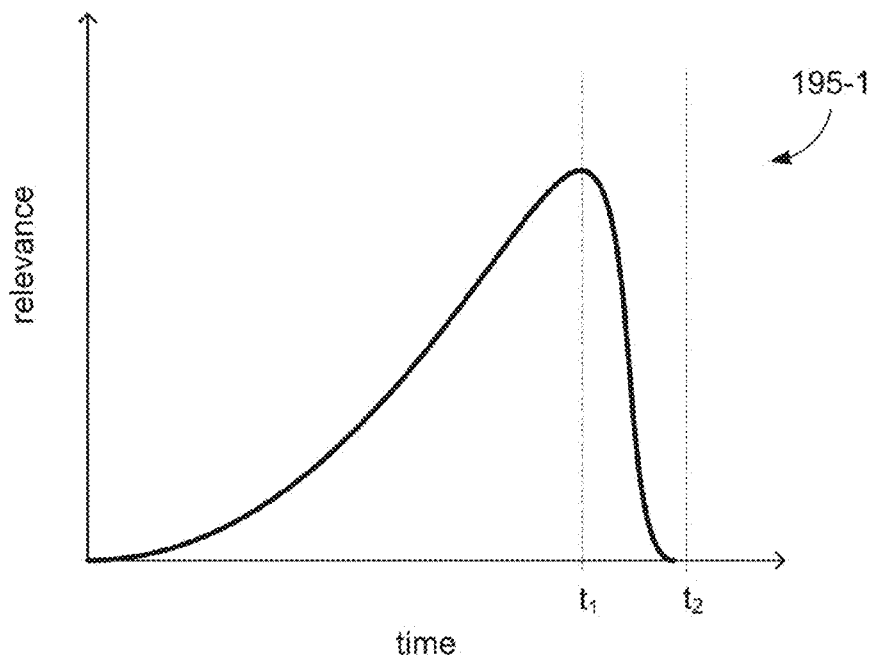
FIG. 5A is a diagram showing an example timeliness profile.
Figure 5B:
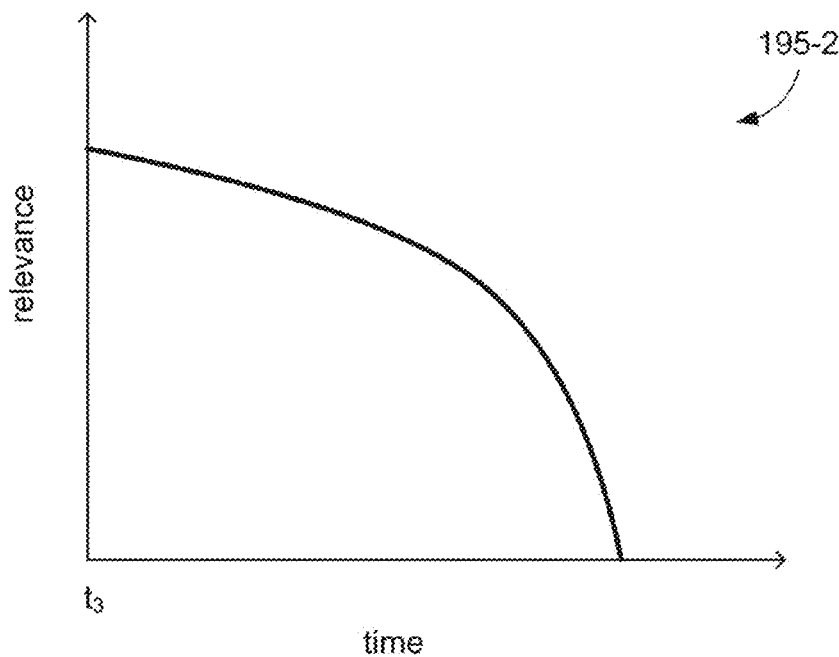
FIG. 5B is a diagram showing another example timeliness profile.

FIG. 5A and FIG. 5B each show an example of a timeliness profile 195-1 and 195-2, respectively. Each of the timeliness profiles 195-1 and 195-2 graphs relevance as a function of time to indicate relevance of a time-sensitive recommendation in terms of a particular point in time. A recommendation is usually time-sensitive if the recommendation is related to an event in time. Different relevance functions are required for different situations for delivering a recommendation. For example, the timeliness profile 195-1 shows a relevance function for a recommendation to prepare for an upcoming event such as a birthday. The date of the event is $t_2$. Accordingly, as seen in FIG. 5A, the relevance increases as the event is approaching and peaks at time $t_1$ which represents the point in time when the user must act on the recommendation. Acting on the recommendation may include the user starting to make a photo book for the birthday which occurs at time, $t_2$. After time, $t_1$, the relevance decreases rapidly as the user has missed the opportunity to utilise the recommendation for best effect.

Depending on the type of task associated with a recommendation, the time between time, $t_1$, and time, $t_2$, may vary according to the nature of the task. For example, the user is likely to require more time to act upon a recommendation for creating an expensive photo book to ensure that a best possible result is achieved compared to a recommendation to post a set of images to a social network.

As seen in FIG. 5B, the timeliness profile 195-2 represents a different relevance function for a situation when a recommendation is made for a user soon after an event. For example, the relevant function of FIG. 5B may apply to posting photographs taken at a party to a social network after the party. Time, $t_3$, is the date of the party. The relevance of the task is at a maximum immediately after the party because the emotion from the event is still high. However, the relevance of the task decreases gradually over time as the emotion and interest for the event wanes.

In one arrangement, a set of timeliness profiles, including the profiles 195-1 and 195-2, may be predefined for a variety of situations and stored within the storage module 109 of the server computer 130. When a recommendation is generated by the recommendation engine module 191, the recommendation engine module 191 associates one of the predefined timeliness profiles 195 stored within the storage module 109 of the server computer 130 matching the situation for making the recommendation to the generated recommendation.

The method 600 of selecting an electronic device 101 for delivering a recommendation is described below with reference to FIG. 6. The method 600 will be described by way of example with reference to the tablet device 101-B. As described above, the recommendation may be associated with the performance of a task by a user and the task may be associated with preference for a type of device 101 for performing the recommended task. The recommendation may recommend that the user perform the task on a particular device (e.g., the tablet device 101-B). The method 600 may be implemented as one or more software code modules of the software application program 133 (e.g., the recommendation delivery module 196) resident in the ROM 160 of the server computer 130 and being controlled in its execution by the processor 105 of the server computer 130. The method 600 determines if a current point in time is a good time for delivering a pending recommendation.

The method 600 starts at detecting step 610, where the recommendation delivery module 194, under execution of the processor 105 of the server computer 130, detects starting of a mobile application or logging on to a website indicating that the user has started a current session on one of the electronic devices 101. For example, a mobile application may be executed on the tablet device 101-B indicating that the user has started a current session on the tablet device 101-B.

At usage profile receiving step 620, the recommendation delivery module 194, under execution of the processor 105 of the server computer 130, receives the usage profile 192 of each of the electronic devices 101-A, 101-B, 101-C and 101-D accessible to the user. The usage profiles 192 may be stored within the RAM 170 of the server computer 130.

Then at recommendation receiving step 630, the recommendation delivery module 194 receives a recommendation 193 generated by the recommendation engine module 191 for the user, where the recommendation is pending delivery at an appropriate time. The recommendation may be stored within the RAM 170 of the server computer 130.

At step 640, the recommendation delivery module 194, under execution of the processor 105 of the server computer 130, performs the step of receiving the device preferences 197 (i.e., defining preference ratings) for each of the plurality of electronic devices 101. As described above, the device preferences are based on the user's preference to perform the associated task (or recommended task) of the recommendation received at step 630 on the corresponding device 101. Also at step 640, the recommendation delivery module 194, under execution of the processor 105 of the server computer 130, receives the timeliness profile 195 associated with the recommendation 193. As described above, the timeliness profile 195 defines the relevance of delivering the recommendation over a period of time and, in particular, the change in relevance over the time period. The device preferences 197 and the timeliness profile 195 may be stored within the RAM 170 of the server computer 130.

Then at suitability rating determining step 650, the recommendation delivery module 194, under execution of the processor 105 of the server computer 130, uses available information, including the usage profile 192, the device preferences 197 and the timeliness profiles (e.g., 195-1. 195-2), to determine a suitability rating for delivering the recommendation 193 to the tablet device 101-B (i.e., the current device) and also to the other devices 101-A, 101-C or 101-D if the user may use one of the other devices 101-A, 101-C or 101-D according to the usage file 192 while the recommendation 193 is still sufficiently relevant according to the timeliness profile 195.

At step 660, if the processor 105 of the sever computer 130 determines that the suitability rating for delivering the recommendation 193 to the current device 101-B, at the current point in time, is higher than for the other devices 101-A, 101-C and 101-D, then the method 600 proceeds to step 670. Otherwise, the method 600 returns to step 610. In this instance, the recommendation delivery module 194 withholds delivery of the recommendation 193 and waits for a better time when the user will potentially use a more preferred device 101 or when the recommendation 193 will become more relevant according to the timeliness profile 195. Suitability rating determining step 650 and device selection deciding step 660 will be illustrated later with reference to FIG. 7 by means of an example.

As another arrangement, the recommendation delivery module 194 may determine at step 660 that the suitability rating for delivering the recommendation 193 to the current device 101-B is below a predetermined threshold. For example, the suitability rating may be below the predetermined threshold due to a low relevance level according to the timeliness profile 195 when the current time is still a long while away from the date of the event specific to the timeliness profile 195-1. In this instance, again, the recommendation delivery module 194 withholds delivery of the recommendation 193 and waits for a better time.

In yet another arrangement, the suitability rating may be determined based on a set of operating conditions that the user is under when using the device 101 and the engagement profile 198 associated with a recommendation 193. Such an arrangement will be described later with reference to FIG. 11.

The suitability rating, S, for a particular one of the electronic devices 101 is a function of device preference 197, probability of a device being used and timeliness of the recommendation being delivered in accordance with Equation (2), as follows:

$$S = D_{pref} \times D_{prob} \times R \qquad (2)$$

where S represents suitability rating, $D_{pref}$ represents device preference for the recommendation to be delivered, $D_{prob}$ represents probability of the device being used at a particular point in time, and R represents the relevance of the recommendation according to the associated timeliness profile (e.g., 195-1, 195-2).

The values of all of the terms $D_{pref}$, $D_{prob}$, and R are in a scale between zero (0) and one (1). When S is calculated for the current device, $D_{prob}$ is always 1.0 as there is a 100% certainty that the device is being used.

At selecting step 670, the processor 105 of the server computer 130 performs the step of selecting the current electronic device (i.e., the tablet device 101-B in the present example) on which to deliver the recommendation 193. Also at step 670, the processor of the server computer 130 delivers the recommendation 193 to the current electronic device 101-B via the network 120 using the connection 122. When the tablet device 101-B receives the recommendation 193, the processor 105 of the tablet device 101-B may display the recommendation as a textual message on the display 114 of the tablet device 101-B. The recommendation 193 is delivered to the current electronic device 101-B at the current point in time. Accordingly, in the described method 600, the electronic device (e.g., the tablet device 101-B in the present example) on which to deliver the recommendation 193 is selected based on a suitability rating of the selected electronic device and the timeliness profile associated with the recommendation. Further, the recommendation may be delivered at a particular point in time. As described in further detail below, the electronic device (e.g., the tablet device 101-B in the present example) on which to deliver the recommendation 193 is also selected based on predicted future use of one or more of the plurality of other devices 101-A, 101-C and 101-D.

Figure 7:
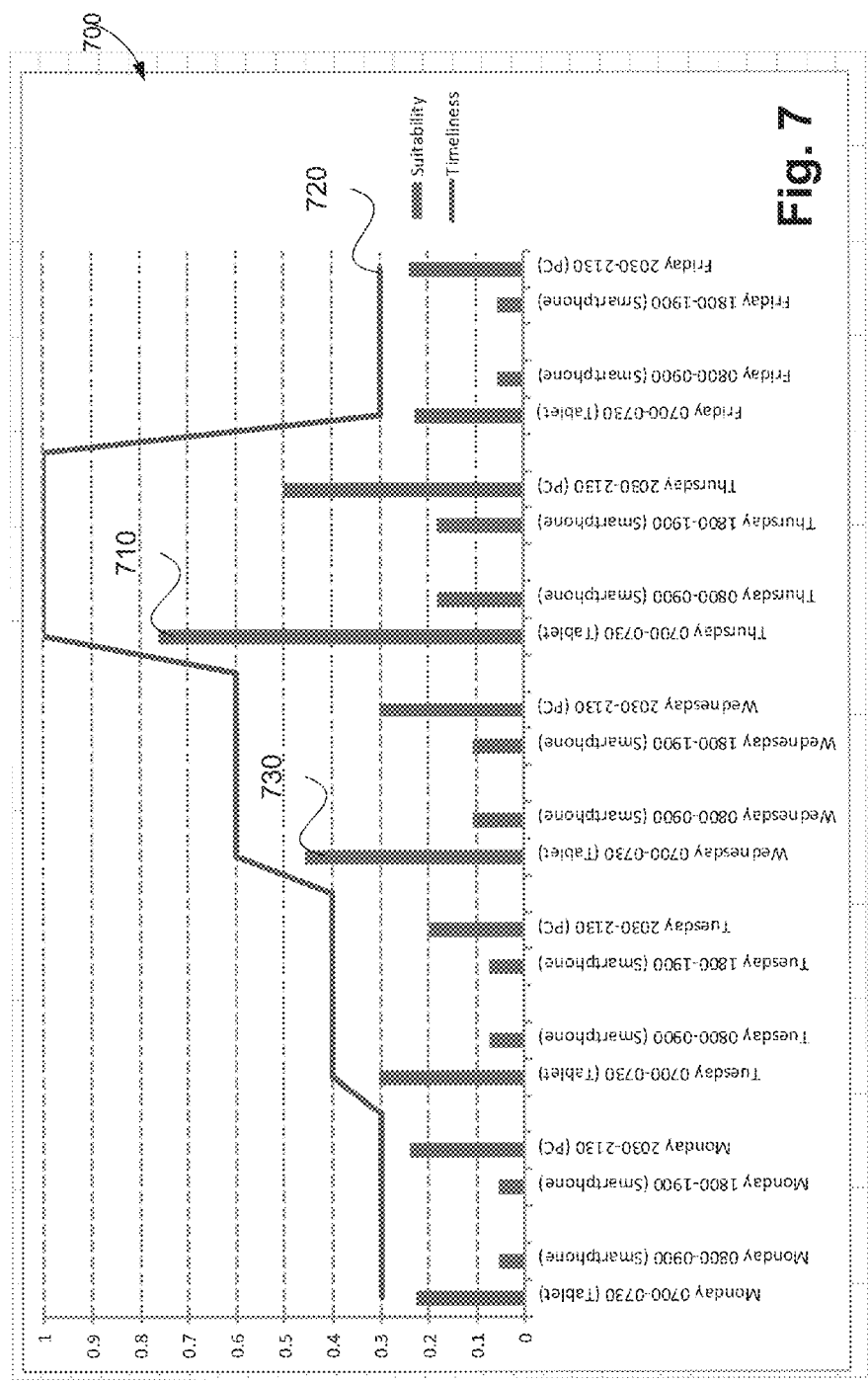
FIG. 7 is a diagram showing a graphical representation of suitability ratings and recommendation relevance in terms of time.

FIG. 7 is a graph 700 showing an example of suitability ratings determined for a user's typical device usage sessions. The determined suitability ratings of FIG. 7 are based on the example usage profile 192 shown in FIG. 2, the example device preferences 197 shown in FIG. 4 for a photo book recommendation and also the example timeliness function 720 as shown in FIG. 7. The line 720 shown in FIG. 7 represents relevance of delivering the recommendation at a particular time.

As seen in FIG. 7, suitability rating 710 for delivering a photo book recommendation to the tablet device 101-B on Thursday between 7:00 AM and 7:30 AM is therefore:

$$S = D_{pref} \times D_{prob} \times R = 0.8 \times 0.95 \times 1.0 = 0.76$$

Similarly, suitability ratings may be determined for other device usage sessions according to the example usage profile 192 of FIG. 2 around a relevant period (i.e., Monday to Friday) of the timeliness function example 720. In one arrangement, the recommendation delivery module 194 uses the graph 700 plotting suitability ratings to determine, at step 650, a suitability rating for delivering the recommendation 193 to the tablet device 101-B (i.e., the current device). The recommendation delivery module 194 may use the graph 700 for determining (or for predicting) if there is a better time for delivering a recommendation by comparing the suitability rating for delivering the recommendation at the current point in time with other suitability ratings corresponding to future device usage sessions. For example, if the user is currently using the tablet device 101-B during the period 7:00 AM-7:30 AM on Wednesday, as shown in FIG. 7, the suitability rating 730 will be (0.8*1.0*0.6)=0.48 where $D_{prob}$ is 1.0 for the current device (i.e., tablet device 101-B). In accordance with the example of FIG. 7, when comparing the current suitability rating with other future suitability ratings, there is at least one potential session (i.e. Thursday 7:00 AM-7:30 AM), when the suitability rating 710 is higher. In the example, the recommendation will be withheld at step 660 for delivery at a better time in the future assuming that the user will use the tablet device 101-B on the coming Thursday. In another example, if there is no potential device usage session with a higher suitability rating in the future, at step 660, then the method 600 proceeds to step 670 and the recommendation is delivered to the current device (i.e., tablet device 101-B). Accordingly, the graph 700 comprises details for predicting use of each of the plurality of electronic devices 101.

As mentioned above, the arrangement for determining the suitability rating based on a set of operating conditions that the user is under when using the device 101 and the engagement profile 198 associated with a recommendation 193 will now be described. The arrangement may be implemented in the suitability rating determining step 650 of the method 600.

The described methods recognise a set of operating conditions that can influence the utilisation of a recommendation and present the recommendation when the operating conditions are suitable. The operating conditions that are considered, in accordance with the described methods, are related to the electronic device 101 being used by a user of the device 101 to receive a recommendation and to subsequently perform a task associated with the recommendation on the device 101.

The operating conditions that are considered are also related to "current usage environment". Current usage environment refers to the environmental factors that the user of the device 101 is operating under and/or currently experiencing. Current usage environment may include information such as current location of the electronic device 101. The current location of the electronic device 101 may be determined based on a physical geo-location or a logical location (e.g., on a train travelling from home to the office, etc.).

Current usage environment may also include current activity (e.g. browsing news articles on the device 101) and level of user interface interactivity with the electronic device 101 being used to carry out the current activity (e.g. frequency of user interface gestures such as swiping and tapping on user interface objects).

The described methods determine suitability of operating conditions, currently being experienced by the user, for delivery of a recommendation that is associated with a task. If the recommendation is deemed suitable, the user should be in a position to utilise the recommendation. The user should also be in a position to act upon the associated task when presented with the recommendation, rather than dismissing the recommendation or postponing the action due to unsuitable operating conditions preventing the user from doing so at the time of delivery. As such, a rejection of a recommendation presented in accordance with the described methods, is more potentially due to content of the recommendation rather than timing of the delivery.

The described methods determine a suitability rating for a recommendation delivery by comparing what is required of the user for acting on the recommendation and current operating conditions of the user. Such a comparison is used to ensure that the conditions are suitable for performing the task associated with the recommendation.

FIG. 8 shows another example of a usage profile 192 with additional fields to capture the operating conditions. The usage profile 192 is a pattern of typical device usage sessions for the electronic device 101. Each of the usage sessions is associated with a set of operating conditions. As described in detail below, a particular cluster of one or more of the usage sessions is represented in the usage profile 192 by a particular device usage session record. For example, device usage session record 810 represents a typical usage session for a time period between 8 AM and 9 AM for the user using the electronic device 101 to browse the Internet on the way to work. The device usage session record 810 indicates that the level of interactivity with the electronic device 101 is relatively low for reading web pages during a particular period associated with the record 810.

The usage profile 192 is constructed from device usage session analytics collected for the electronic device 101 over a period of time. The usage profile 192 may be continually updated by the usage profiler 196, under execution of the controller 102 of the device 101, to maintain an up-to-date profile for the user. If such analytics show that the user uses the device 101 on a regular basis during a particular time and day of the week and/or at a particular location, there is a corresponding device usage session record in the usage profile 192 to indicate such typical session.

The usage profile 192 enables the recommendation delivery module 194 to determine the likely usage of the electronic device 101 and operating conditions at the time of potential recommendation delivery. A device usage session record, such as the record 810, may include the following fields:
  (i) SessionPeriod: time period of the day and the day of the week when the user would typically use the device 101;
  (ii) DeviceType: type of device;
  (iii) TypeOfAppSet: types of applications that would typically be used in a session during the time period;
  (iv) InteractivityLevel: amount of user interface interactions the user would typically have with the device 101 during a session during the time period;
  (v) GeoLocation: physical location of the device 101 during a session during the time period (or start and end locations if the user is in transit during the time period);
  (vi) LogicalLocation: is the logical location corresponding to the GeoLocation in accordance with a context for the user.

Figure 9:
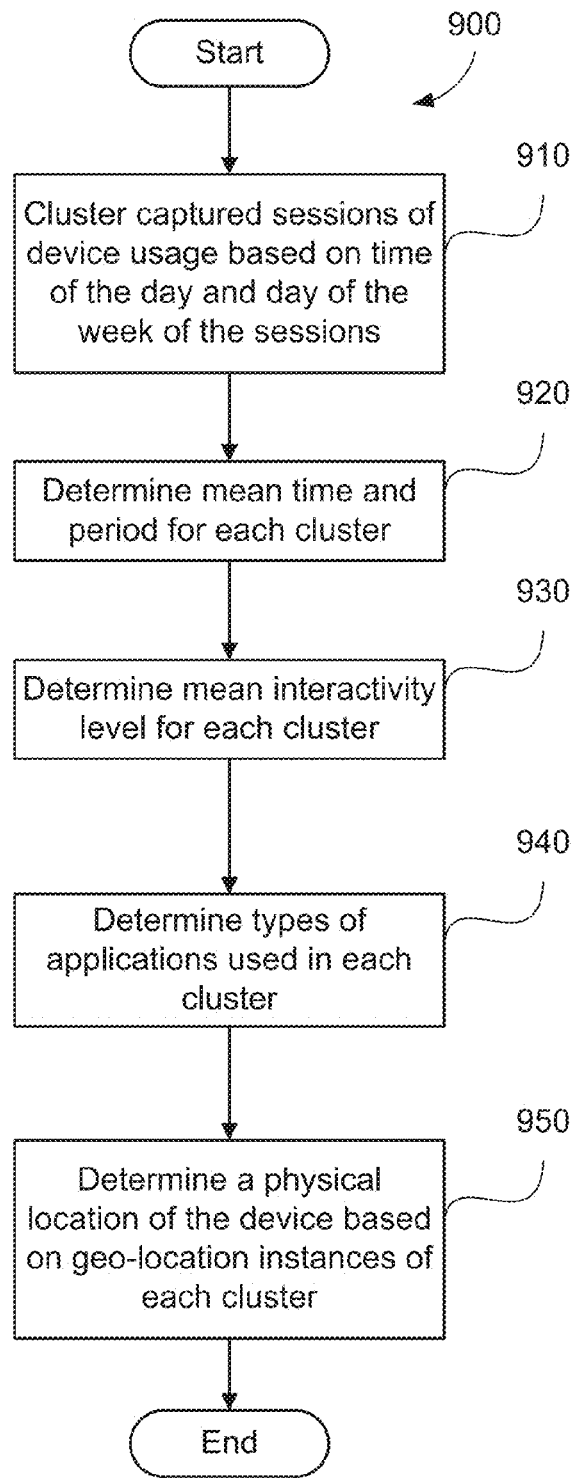
FIG. 9 is a schematic flow diagram showing a method of determining a usage profile with operating conditions.
Figure 11:
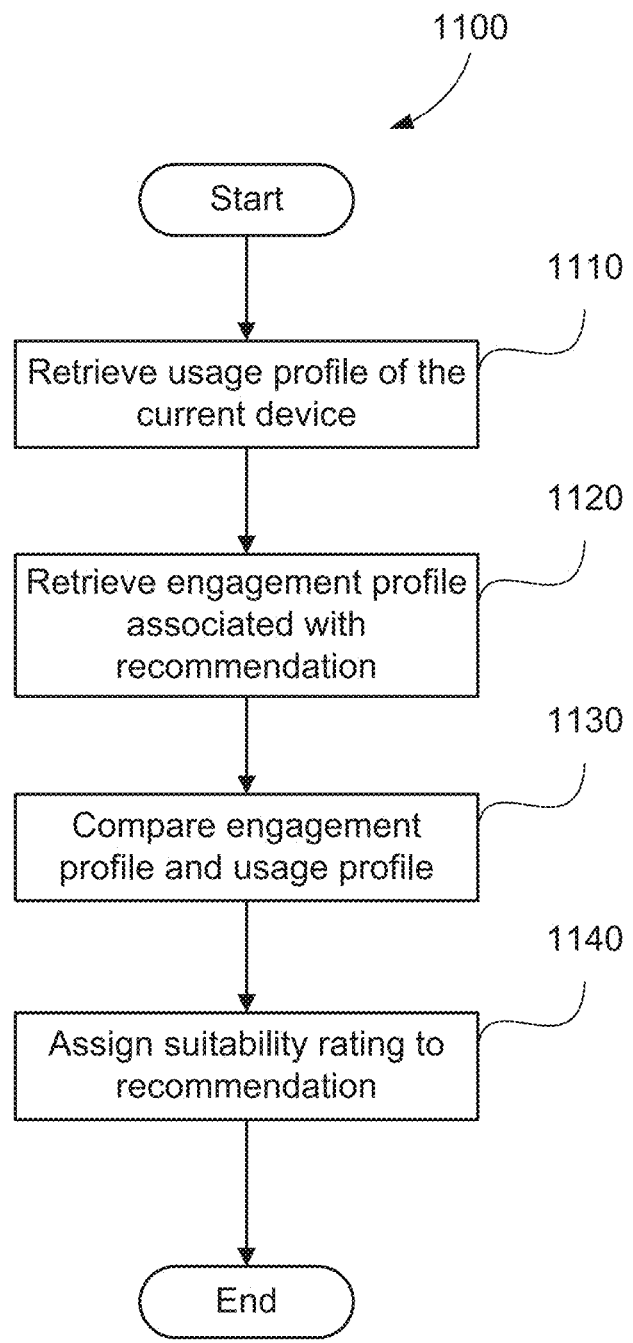
FIG. 11 is a schematic flow diagram showing a method of determining a suitability rating for a recommendation, as used in the method of FIG. 6.

FIG. 9 is a schematic flow diagram showing a method 900 of determining a usage profile 192 with the extension of operating conditions. The method 900 may be implemented as one or more software code modules of the software application program 133 (e.g., the usage profiler 196) resident in the ROM 160 and being controlled in its execution by the processor 105 of the device 101.

The method 900 will be described by way of example where the usage profile 196 is determined for the electronic device 101. The method 900 determines a usage profile 192 from the analytics of collected device usage sessions. The usage profile 192 determined in accordance with the method 900 includes the information for five of the fields described above (i.e., SessionPeriod, TypeOfAppSet, InteractivityLevel, GeoLocation, LogicalLocation). The determined usage profile 192 is configured for defining a measure of user interactions with the electronic device 101 for a period of time.

The method 900 starts at collecting step 910, where the usage profiler module 196, under execution of the processor 105 of the device 101, clusters usage sessions for the electronic device 101 based on time of the day and the day of the week (e.g., 0800-0900 Monday, 1800-0900 Monday). Each resulting cluster corresponds to a regular behaviour of device usage by the user and is represented by a record (e.g., 810) created in the usage profile 192 stored within the storage module 109 of the device 101. Each cluster is associated with the SessionPeriod field of the usage profile 192 stored within the storage module 109 of the device 101.

At mean time determining step 920, the sessions in each cluster are aggregated by the processor 105 to determine a mean time of the day and day of the week for the corresponding record in the usage profile 192. Clusters with a very small number of sessions may be ignored because such clusters are insignificant as an indicator of a regular behaviour. The aggregated clusters are stored within the storage module 109 of the device 101.

At mean interactivity level determining step 930, a mean interactivity level (InteractivityLevel) is determined for each cluster by the processor 105 of the device 101 and stored within the storage module 109 of the device 101. Step 930 involves summing the number of user interface gestures including touch screen swipes, and taps and button presses and determining an average number of gestures per minute (e.g., 5 gestures/min, 45 gestures/min, 15 gestures/min) for the duration of each session within a cluster. The determined average numbers of gestures per minute, as determined at step 930, are stored by the processor 105 of the device 101 within the storage module 109 of the device 101. The determined average numbers of gestures per minute are each associated with a corresponding cluster within the storage module 109 of the device 101.

Then at determining step 940, a set of types of applications (TypeOfAppSet) is determined by the processor 105 for each corresponding cluster. Each set is determined by combining the types of applications used in the corresponding session of a cluster into a set, such that the set includes top occurrences of the various types of applications (e.g., Internet browser application, game, photography, mapping) in each cluster. Applications with low occurrences are not regarded as regular applications used by the user for the corresponding cluster of sessions. Each set determined in step 940 is stored in the storage module 109 of the device 101. Each stored set is associated with a corresponding cluster within the storage module 109 of the device 101.

At location determining step 950, a logical location (LogicalLocation) is determined by the processor 105 of the device 101 based on the physical location of the device 101 (GeoLocation instances) at the start and end of the sessions. In particular, the processor 105 of the device 101 correlates the geo-locations at the start and end of the sessions with known geo-locations such as home, work, café, gymnasium etc., as provided by the user, to determine the logical location (e.g., travelling from home to work, travelling from work to home, home). Each of the determined logical locations is stored within the storage module 109 of the device 101. Each determined logical location is associated with a corresponding cluster of sessions within the storage module 109 of the device 101.

FIG. 10 shows an example of multiple instances (e.g., 1001, 1002, 1003) of an engagement profile 198. Each instance (e.g., 1001, 1002, 1003) is associated with a recommendation 193 by the recommendation engine module 191. Each instance (e.g., 1001, 1002, 1003) of the engagement profile 198 is a record that includes the following data fields, each of the data fields specifying preferred conditions necessary to provide a satisfactory user experience to the user of the device 101 when performing the task associated a recommendation.

DeviceType: minimal device preferred for receiving the associated recommendation primarily based on screen size. For example, if an engagement profile instance associated with a recommendation is of DeviceType, smart phone, the recommendation is suitable to be delivered to a smart phone, a tablet or a PC. In contrast, the DeviceType, tablet, is suitable for a tablet or PC but not a smart phone;

InteractivityLevel: expected level of user interface interactions with the device 101 when performing the task associated with the recommendation on the device 101. Similar to the InteractivityLevel in the usage profile 192, the InteractivityLevel in the engagement profile 198 is also measured in gestures per minute (10 gestures/min, 35 gestures/min, 15 gestures/min). The value determined for the InteractivityLevel in the engagement profile 198 may be determined from the user's history of performing the particular type of task associated with a recommendation. For example, if the user has performed a photo-book creation task on a particular device on multiple occasions previously, either as a result of a recommendation or on the user's own accord, the time and the number of gestures taken can be recorded and used to determine an average gestures per minute for the photo-book creation task. If the user does not have sufficient history, the value may be determined as an average from other users.

Duration: expected amount of time required of the user to complete the task associated with the recommendation. The value of the duration can be determined in a similar way as the InteractivityLevel.

PreferredLocation: preferred location for the user to receive the associated recommendation (e.g. Home rather than Work).

The designation of an engagement profile 198 instance (e.g., 1001) to a recommendation 193 is primarily based on the nature of the effort required of the user for the task associated with the recommendation 193. For example, a relatively low interactivity level (InteractivityLevel) and required time (Duration) is required for a photo-card compared to a photo-book merchandise recommendation with many pages, since a photo-card typically has far fewer photos for the user to review or possibly edit compared to a photo-book. The method 1100 of determining a suitability rating for a recommendation based on usage profile 192 with operating conditions and engagement profile 198, as an optional arrangement of the suitability rating determining step 650 of the method 600, will now be described with reference to FIG. 11. The method 1100 may be implemented as one or more software code modules of the software application program 133 resident in the ROM 160 of the server computer 130 and being controlled in its execution by the processor 105 of the server computer 130.

The method 1100 begins at retrieving step 1110, where the processor 105 of the server computer 130 performs the step of retrieving the usage profile 192 of the current electronic device 101 being used. The usage profile 192 contains the SessionPeriod, DeviceType, TypeOfAppSet, InteractivityLevel, GeoLocation and LogicalLocation information related to the operating conditions as described above. The determined information for each of the fields may be retrieved from the storage module 109 of the device 101 via the network 120.

At retrieving step 1120, the processor 105 of the server computer 130 retrieves the instance (e.g., 1001) of the engagement profile 198 associated with the recommendation 193 received at step 630 of the method 600 where the method 1100 is being executed during the method 600. The processor 105 of the server computer 130 retrieves the instance (e.g., 1001) by accessing the engagement profile 198 associated with at least one task to be recommended with the recommendation. The engagement profile 198 is used for specifying device-user interactions required in order to action the task to be recommended.

Then at comparing step 1130, the processor 105 of the server computer 130 determines a suitability rating for the recommendation. The suitability rating is determined for the recommendation by comparing the usage profile 192 for the device 101 with the engagement profile 198 associated with the task to be recommended by the recommendation. In particular, the suitability rating is determined at step 1130 by comparing related fields (e.g., the DeviceType field) of the retrieved instance (e.g., 1001) of the engagement profile 198 and the corresponding usage session in the usage profile 192.

Figure 12:
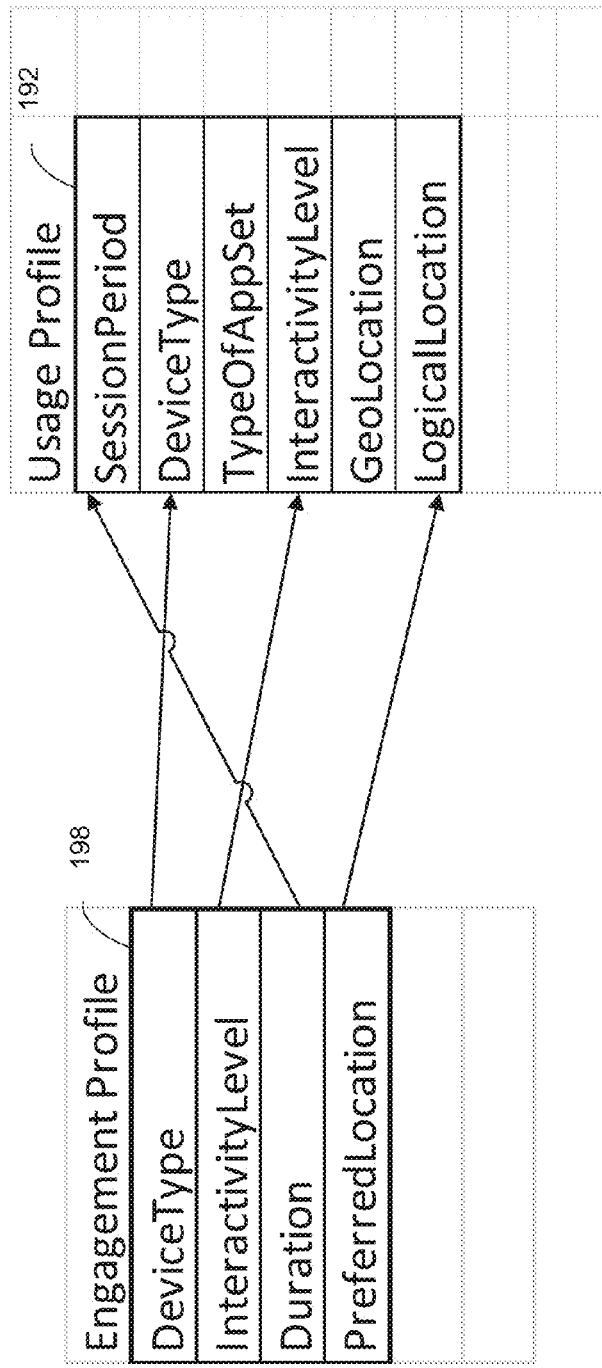
FIG. 12 shows mapping between an engagement profile and a usage profile.

In one arrangement, the related fields used for comparing the engagement profile 198 and the usage profile 192 are shown in FIG. 12. As seen in FIG. 12, the DeviceType field specified in the engagement profile 198 is compared with the DeviceType field of the usage profile 192; the InteractivityLevel field specified in the engagement profile 198 is compared with the InteractivityLevel field of the usage profile 192; the Duration field specified in the engagement profile 198 is compared with the duration derived from the SessionPeriod field of the usage profile 192; and the PreferredLocation field specified in the engagement profile 198 is compared with the LogicalLocation field of the usage profile 192. Not shown in this arrangement, the TypeOfAppSet field in the usage profile 192 may be used to compare with the engagement profile 198 based on the interactivity level typical of the type of applications specified in the TypeOfAppSet field. For example, a game typically has a high interactivity level while a reader application has a low interactivity level.

A comparison function may be used at comparing step 1130 to yield a status indicating whether an aspect of the engagement profile 198 is satisfied by the usage profile 192. The resulting status is combined mathematically to produce a suitability rating in the form of a percentage. For a percentage of 100%, all aspects of the engagement profile 198 are satisfied by the usage profile 192. In one arrangement, the mathematical calculation is a weighted mean of the comparison functions below:

$$\frac{\sum_{n=1}^{n} W_i f_i(e, u)}{\sum_{n=1}^{n} W_i}$$

where $f_i(e,u)$ is a comparison function comparing a field in the engagement profile, e, with the corresponding field in the usage profile, u. That is, there is a comparison function corresponding to each of the fields used for comparing the engagement profile 198 with the usage profile 192 as shown in FIG. 12. Each comparison function returns a numeric value between 0.0 and 1.0 indicating suitability of the corresponding aspect, where 1.0 is most suitable. For example, the comparison function for the DeviceType field will return 1.0 if the DeviceType field of the engagement profile 198 is tablet and the DeviceType field of the usage profile 192 is also tablet or a more capable device. Further, the comparison function for the DeviceType field will return 0.0 if the DeviceType field of the engagement profile 198 is tablet and the DeviceType field for the usage profile 192 is smart phone or a less capable device.

$W_i$ is a weighting factor configured to provide more weight for more important aspects, such as DeviceType and InteractivityLevel. For example, with the following engagement profile 198, usage profile 192 and weighting factors: $W_i = \{2, 2, 1, 1\}$; EngagementProfile (smart phone, 10 gestures/min, 15 mins, Home); and UsageProfile (smart phone, 15 gestures/min, 30 mins, Travelling), the suitability rating determined for the recommendation at step 1130 is $(2*1.0+2*1.0+1*1.0+1*0.0)/(2+2+1+1)=83\%$ with only the PreferredLocation of the engagement profile 198 not satisfied by the LogicalLocation of the usage profile 192.

The method 1100 concludes at assigning step 1140, where the suitability rating determined at step 1130 is assigned to the recommendation 193 received at step 630 of the method 600 where the method 1100 is being executed during the method 600. The suitability rating determined at step 1130 may be used to withhold a recommendation if the suitability rating is deemed below a satisfactory threshold. The ratings of multiple recommendations may be used to rank recommendations for prioritisation. The suitability rating determined at step 1130 may be used to withhold a recommendation for any usage that requires comparing the suitability of a recommendation. Accordingly, the method 1100 provides a complementary arrangement to the method 600 for determining the suitability of a recommendation based on the operating conditions the user is currently in when using the device 101.

INDUSTRIAL APPLICABILITY

The arrangements described are applicable to the computer and data processing industries and particularly for delivering recommendations.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A computer-implemented method of displaying a recommendation on a display, said method comprising:
   receiving, by a server, a usage profile of an electronic device via a communication network, the usage profile comprising at least information related to a number of user inputs in relation to the electronic device for a period of time, the usage profile being determined by determining, using the electronic device, user inputs in relation to the electronic device;
   accessing, by the server, an engagement profile associated with a task to be recommended, the engagement profile comprising a field indicating a number of user inputs required in order to perform the task to be recommended on the electronic device;
   determining, by the server, a suitability rating for a recommendation to perform the task on the electronic device by comparing the usage profile and the engagement profile using a plurality of weighting factors, wherein comparing the usage profile and the engagement profile includes performing a first comparison and a second comparison, the first comparison performed by comparing first information included in the engagement profile with first information included in the usage profile, the second comparison performed by comparing second information included in the engagement profile with second information included in the usage profile, and wherein using a plurality of weighting factors includes using a first weighting factor for the first comparison and a second weighting factor for the second comparison, the second weighting factor different from the first weighting factor;
   determining, by the server, a time for delivering the recommendation to perform the task on the electronic device based on a device type of the electronic device; and
   sending, to the electronic device, the recommendation to perform the task on the electronic device based on the determined time for delivering the recommendation and a determination that the suitability rating exceeds a predetermined threshold, wherein the electronic device is configured to present the recommendation on the display.

2. The method according to claim 1, wherein the usage profile is based on a usage history of the electronic device.

3. The method according to claim 2, wherein the usage profile is determined by identifying repeating patterns in the usage history.

4. The method according to claim 1, further comprising determining the device type for the electronic device for use in the usage profile.

5. The method according to claim 1, further comprising determining a time of use of the electronic device.

6. The method according to claim 1, further comprising determining types of applications used during a time period.

7. The method according to claim 1, further comprising determining physical location of the electronic device during a time period.

8. The method according to claim 1, further comprising determining a logical location based on a physical location of the electronic device during the time period.

9. The method according to claim 1, wherein the usage pattern is determined by clustering usage sessions based at least on time of the day, storing the determined clusters in the memory, and associating a session duration and an average number of user inputs detected for the determined cluster.

10. The method according to claim 1, wherein at least one record of the usage profile comprises at least one of a geographical location of the electronic device and a logical location of the electronic device.

11. The method according to claim 10, wherein the logical location of the electronic device is determined by correlating a geographical location of the electronic device with at least one predetermined geographical location.

12. The method according to claim 1, wherein the engagement profile comprises a number of user gestures in relation to the electronic device required in order to perform the task to be recommended on the electronic device, expected amount of time required to complete the task, and a preferred location.

13. The method according to claim 1, wherein the first information included in the engagement profile is the number of user inputs required in order to perform a task to be recommended on the electronic device, the first information included in the usage profile is the information related to the number of user inputs in relation to the electronic device for a period of time.

14. The method according to claim 1, wherein the second information included in the engagement profile is the device type, and the second information included in the usage profile is device type associated with a particular usage session.

15. The method according to claim 1, wherein the second information included in the engagement profile is a logical location, and the second information included in the usage profile is a logical location associated with a particular usage session.

16. The method according to claim 1, wherein the recommendation to perform the task on the electronic device is a recommendation to create a photobook on the electronic device.

17. An apparatus for displaying a recommendation on a display, said apparatus comprising:
   means for receiving a usage profile of an electronic device via a communication network, the usage profile comprising at least information related to a number of user inputs in relation to the electronic device for a period of time, the usage profile being determined by determining, using the electronic device, user inputs in relation to the electronic device;
   means for accessing an engagement profile associated with a task to be recommended, the engagement profile comprising a field indicating a number of user inputs required in order to perform the task to be recommended on the electronic device;
   means for determining a suitability rating for a recommendation to perform the task on the electronic device by comparing the usage profile and the engagement profile using a plurality of weighting factors, wherein comparing the usage profile and the engagement profile includes performing a first comparison and a second comparison, the first comparison performed by comparing first information included in the engagement profile with first information included in the usage profile, the second comparison performed by comparing second information included in the engagement profile with second information included in the usage profile, and wherein using a plurality of weighting factors includes using a first weighting factor for the first comparison and a second weighting factor for the second comparison, the second weighting factor different from the first weighting factor;
   means for determining a time for delivering the recommendation to perform the task on the electronic device based on a device type of the electronic device; and
   means for sending, to the electronic device, the recommendation to perform the task on the electronic device based on the determined time for delivering the recommendation and a determination that the suitability rating exceeds a predetermined threshold, wherein the electronic device is configured to present the recommendation on the display.

18. A system for displaying a recommendation on a display, the system comprising:
   a memory for storing data and a computer program; and
   a processor coupled to the memory for executing said computer program, said computer program comprising instructions for:
      receiving, by a server, a usage profile of an electronic device via a communication network, the usage profile comprising at least information related to a number of user inputs in relation to the electronic device for a period of time, the usage profile being determined by determining, using the electronic device, user inputs in relation to the electronic device;
      accessing, by the server, an engagement profile associated with a task to be recommended, the engagement profile comprising a field indicating a number of user inputs required in order to perform the task to be recommended on the electronic device;
      determining, by the server, a suitability rating for a recommendation to perform the task on the electronic device by comparing the usage profile and the engagement profile using a plurality of weighting factors, wherein comparing the usage profile and the engagement profile includes performing a first comparison and a second comparison, the first comparison performed by comparing first information included in the engagement profile with first information included in the usage profile, the second comparison performed by comparing second information included in the engagement profile with second information included in the usage profile, and wherein using a plurality of weighting factors includes using a first weighting factor for the first comparison and a second weighting factor for the second comparison, the second weighting factor different from the first weighting factor;
      determining, by the server, a time for delivering the recommendation to perform the task on the electronic device based on a device type of the electronic device; and
      sending, to the electronic device, the recommendation to perform the task on the electronic device based on the determined time for delivering the recommendation and a determination that the suitability rating exceeds a predetermined threshold, wherein the electronic device is configured to present the recommendation on the display.

19. A non-transitory computer readable medium with a computer program stored thereon for displaying a recommendation on a display, said computer program comprising:
   code for receiving, by a server, a usage profile of an electronic device via a communication network, the usage profile comprising at least information related to a number of user inputs in relation to the electronic device for a period of time, the usage profile being determined by determining, using the electronic device, user inputs in relation to the electronic device;
   code for accessing, by the server, an engagement profile associated with a task to be recommended, the engagement profile comprising a field indicating a number of user inputs required in order to perform the task to be recommended on the electronic device;
   code for determining, by the server, a suitability rating for a recommendation to perform the task on the electronic device by comparing the usage profile and the engagement profile using a plurality of weighting factors, wherein comparing the usage profile and the engagement profile includes performing a first comparison and a second comparison, the first comparison performed by comparing first information included in the engagement profile with first information included in the usage profile, the second comparison performed by comparing second information included in the engagement profile with second information included in the usage profile, and wherein using a plurality of weighting factors includes using a first weighting factor for the first comparison and a second weighting factor for the second comparison, the second weighting factor different from the first weighting factor;

code for determining, by the server, a time for delivering the recommendation to perform the task on the electronic device based on a device type of the electronic device; and code for sending, to the electronic device, the recommendation to perform the task on the electronic device based on the determined time for delivering the recommendation and a determination that the suitability rating exceeds a predetermined threshold, wherein the electronic device is configured to present the recommendation on the display.

20. A computer-implemented method of displaying a recommendation using a display, said method comprising:

receiving, by a server, a usage profile of an electronic device via a communication network, the usage profile being stored using a usage profile data structure comprising at least information related to a plurality of user inputs in relation to the electronic device for a period of time, the usage profile being determined by detecting user inputs in relation to the electronic device, wherein the information related to the plurality of user inputs in relation to the electronic device for a period of time is updated over the communication network;

accessing, by the server, an engagement profile associated with a task to be recommended, the engagement profile comprising data indicating a plurality of user inputs in relation to the electronic device required in order to perform the task to be recommended on the electronic device;

determining, by the server, a suitability rating for a recommendation to perform the task on the electronic device by comparing the usage profile and the engagement profile stored in the memory;

determining, by the server, a time for delivering the recommendation to perform the task on the electronic device based on a device type of the electronic device; and sending, to the electronic device, the recommendation to perform the task on the electronic device based on the determined time for delivering the recommendation and a determination that the suitability rating exceeds a predetermined threshold, wherein the electronic device is configured to present the recommendation on the display.

21. The method according to claim 20, wherein determining the suitability rating comprises comparing at least the information related to a number of user inputs in relation to the electronic device for a period of time in the usage profile with the data indicating a number of user inputs in the engagement profile.

* * * * *